(12) United States Patent  (10) Patent No.: US 8,782,368 B2
Lillibridge et al.  (45) Date of Patent: Jul. 15, 2014

(54) STORING CHUNKS IN CONTAINERS

(75) Inventors: Mark David Lillibridge, Mountain View, CA (US); Deepavali Mahendra Bhagwat, Mountain View, CA (US); Peter Thomas Camble, Bristol (GB); Gregory Trezise, Wells (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 416 days.

(21) Appl. No.: 12/777,478

(22) Filed: May 11, 2010

(65) Prior Publication Data

US 2010/0223441 A1 Sep. 2, 2010

Related U.S. Application Data

(63) Continuation-in-part of application No. 12/671,334, filed as application No. PCT/US2007/022585 on Oct. 25, 2007.

(51) Int. Cl.
*G06F 12/02* (2006.01)

(52) U.S. Cl.
USPC ............................ 711/165; 711/162; 711/170

(58) Field of Classification Search
USPC .......... 711/165, 170, 154, 161, 162, E12.001, 711/E12.002, E12.009
See application file for complete search history.

(56) References Cited

U.S. PATENT DOCUMENTS

| | | | |
|---|---|---|---|
| 5,638,509 A | 6/1997 | Dunphy | |
| 6,396,838 B1 | 5/2002 | Palnati | |
| 6,542,975 B1 | 4/2003 | Evers et al. | |
| 6,928,526 B1 | 8/2005 | Zhu et al. | |
| 6,938,005 B2 | 8/2005 | Iverson | |
| 7,028,158 B1* | 4/2006 | Beatty et al. ................... | 711/202 |
| 7,065,619 B1 | 6/2006 | Zhu et al. | |
| 7,082,548 B2 | 7/2006 | Nakano | |
| 7,269,689 B2 | 9/2007 | Eshghi | |
| 7,472,242 B1* | 12/2008 | Deshmukh et al. ........... | 711/162 |
| 7,584,338 B1* | 9/2009 | Bricker et al. ................ | 711/162 |
| 7,788,233 B1* | 8/2010 | Iyer et al. ...................... | 707/661 |
| 7,913,056 B2* | 3/2011 | Brown et al. .................. | 711/203 |
| 7,917,722 B2* | 3/2011 | Yamamoto et al. ........... | 711/171 |
| 7,925,683 B2* | 4/2011 | Jain et al. ...................... | 711/162 |
| 7,979,670 B2* | 7/2011 | Saliba et al. .................. | 711/216 |
| 8,099,573 B2 | 1/2012 | Camble et al. | |
| 8,140,637 B2 | 3/2012 | Slater et al. | |

(Continued)

FOREIGN PATENT DOCUMENTS

| | | |
|---|---|---|
| CN | 1692356 | 11/2005 |
| EP | 2012235 | 1/2009 |

(Continued)

OTHER PUBLICATIONS

Litwin (Linear Hashing: A new tool for file and table addressing), published by IEEE 1980; pp. 212-223.*

(Continued)

*Primary Examiner* — Kaushikkumar Patel

(57) ABSTRACT

Chunks are stored in a container of a data store, where the chunks are produced by dividing input data as part of a deduplication process. In response to determining that the size of the container has reached a predefined size threshold, at least one of the chunks in the container is moved to another container.

18 Claims, 3 Drawing Sheets

(56) References Cited

U.S. PATENT DOCUMENTS

| | | | |
|---|---|---|---|
| 8,156,306 B1* | 4/2012 | Raizen et al. | 711/202 |
| 8,161,255 B2* | 4/2012 | Anglin et al. | 711/162 |
| 8,332,404 B2 | 12/2012 | Camble et al. | |
| 2001/0010070 A1 | 7/2001 | Crockett | |
| 2003/0065898 A1* | 4/2003 | Flamma et al. | 711/165 |
| 2003/0140051 A1* | 7/2003 | Fujiwara et al. | 707/100 |
| 2004/0162953 A1* | 8/2004 | Yoshida et al. | 711/153 |
| 2006/0116990 A1* | 6/2006 | Margolus et al. | 707/3 |
| 2006/0282457 A1* | 12/2006 | Williams | 707/102 |
| 2007/0124415 A1 | 5/2007 | Lev-Ran et al. | |
| 2007/0208788 A1* | 9/2007 | Chakravarty et al. | 707/204 |
| 2007/0250674 A1 | 10/2007 | Fineberg et al. | |
| 2008/0052468 A1 | 2/2008 | Speirs | |
| 2008/0133561 A1 | 6/2008 | Dubnicki | |
| 2008/0244210 A1 | 10/2008 | Vingralek | |
| 2008/0270461 A1* | 10/2008 | Gordon et al. | 707/103 R |
| 2008/0294660 A1* | 11/2008 | Patterson et al. | 707/100 |
| 2008/0301256 A1* | 12/2008 | McWilliams et al. | 709/214 |
| 2009/0037499 A1 | 2/2009 | Muthulingam | |
| 2009/0112946 A1 | 4/2009 | Jones | |
| 2010/0174881 A1* | 7/2010 | Anglin et al. | 711/162 |
| 2010/0198832 A1 | 8/2010 | Jones | |
| 2010/0235372 A1 | 9/2010 | Camble et al. | |
| 2010/0281230 A1* | 11/2010 | Rabii et al. | 711/165 |
| 2012/0137097 A1 | 5/2012 | Slater et al. | |

FOREIGN PATENT DOCUMENTS

| | | |
|---|---|---|
| EP | 2038763 | 3/2009 |
| WO | WO-2006032049 | 3/2006 |
| WO | WO-2006094365 | 9/2006 |
| WO | 2009054827 | 4/2009 |

OTHER PUBLICATIONS

Jula et al., "How to Focus on Memory Allocation Strategies," Technical Report TR07-003, Jun. 18, 2007 (29 pages).

Prof. David August, "Optimizing Malloc and Free," http://gee.cs.oswego.edu/dl/html/malloc.html (8 pages) (2006).

Muthitacharoen et al., "A Low-Bandwidth Network File System" (14 pages) (2001).

U.S. Appl. No. 12/759,174 entitled "Capping a number of Locations Referred to by Chunk References" filed Apr. 13, 2010 (38 pages).

Korean Patent Office, International Search Report and Written Opinion for PCT/US2007/022585 dated Jul. 15, 2008 (7 pages).

GB OA2MO, GB1000247.5, HP reference 82233314, Jan. 23, 2012, 9 pps.

GB OA2MO, GB1000247.5, HP reference 82233314, May 30, 2012, 3 pps.

Notice of Allowance, U.S. Appl. No. 12/671,334, HP reference 82233320, Mar. 3, 2014, 5 pps.

* cited by examiner

STORING CHUNKS IN CONTAINERS

CROSS REFERENCE TO RELATED APPLICATIONS

This application is a continuation-in-part of U.S. Ser. No. 12/671,334, filed Jan. 29, 2010, U.S. Publication No. 2010/0198792, which is a national stage application under 35 U.S.C. 371 of PCT/US2007/022585, having an international filing date of Oct. 25, 2007. Both applications are hereby incorporated by reference.

BACKGROUND

As capabilities of computer systems have increased, the amount of data that is generated and computationally managed in enterprises (companies, educational organizations, government agencies, and so forth) has rapidly increased. Data may be in the form of emails received by employees of the enterprises, where emails can often include relatively large attachments. Moreover, computer users routinely generate large numbers of files such as text documents, multimedia presentations, and other types of data objects that have to be stored and managed.

BRIEF DESCRIPTION OF THE DRAWINGS

Some embodiments are described with respect to the following figures.

DETAILED DESCRIPTION

Figure 1:
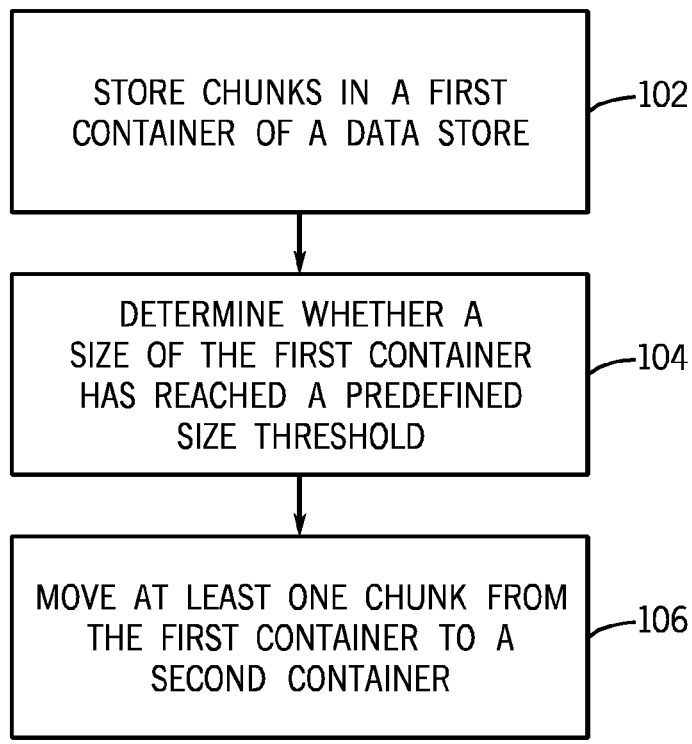
FIG. 1 is a flow diagram of a process of leveling chunks among containers, according to some embodiments.

In an enterprise, such as a company, an educational organization, a government agency, and so forth, the amount of data stored can be relatively large. To improve efficiency, deduplication of data can be performed to avoid or reduce repeated storage of common portions of data in a data store. In some implementations, deduplication of data can be accomplished by partitioning each data object into non-overlapping chunks, where a "chunk" refers to a piece of data partitioned from the data object, and where the data object can be in the form of a file or other type of data object. Examples of data objects include documents, image files, video files, audio files, backups, or any other collection or sequence of data. Upon receiving an input data object, the input data object is divided into chunks by applying a chunking technique. Note that if a data object is sufficiently small, the chunking technique may produce just one chunk.

By dividing each data object into chunks, a chunk-based deduplication system is able to identify chunks that are shared by more than one data object or occur multiple times in the same data object, such that these shared chunks are stored just once in the data store to avoid or reduce the likelihood of storing duplicate data.

Generally, a chunk-based deduplication system divides input data into chunks, determines which chunks have already been stored, and stores new chunks (chunks that have not previously been stored in a data store) to the data store, which is located in a persistent storage media. In some implementations, chunks are stored in chunk containers, where a "container" is a logical data structure of a data store for storing one or multiple chunks. A container can be implemented as a discrete file or object. Chunk containers can also be referred to as "chunk sections."

In some implementations, chunk containers are designed to have a predetermined capacity (maximum size) due to the desirability to hold an entire container or an index to the container in system memory. The system memory can be implemented with a random access memory such as the dynamic random access memory (DRAM), a static random access memory (SRAM), or other relatively high speed memory having a size that is smaller than a size of a persistent storage media, such as a disk-based persistent storage media or integrated circuit or semiconductor-based persistent storage media.

A simple way to layout chunks is to append new chunks to a single open container until the open container becomes full (the open container has reached its capacity or maximum size). When the open container becomes full, the open container is closed, and a new container is opened to receive additional new chunks.

One of the issues associated with using conventional chunk-based deduplication is fragmentation of data. Fragmentation refers to the issue of chunks associated with a particular data object being stored in disparate locations of a data store. For enhanced deduplication, each chunk is (ideally) stored only once and thus is located in just one location of the data store but yet can appear in multiple data objects. This leads to increased fragmentation where chunks of a data object are scattered across a storage media, which can cause read-back of data from the data store to be relatively slow. If the data store is implemented with a disk-based storage device, when a data object is being read back, the chunks of the data object may be scattered across the surface of disk media of the disk-based storage device. This scattering of chunks across the disk media of the disk-based storage device can result in multiple seeks to retrieve the scattered chunks, which can lead to slow read-back operation.

In accordance with some implementations, to reduce fragmentation, rather than always appending new chunks to a single open container, containers are closed when each such container reaches some size threshold that is less than the maximum size of the container. This size threshold is referred to as a "flexing threshold." A container having a size that has reached the flexing threshold is closed such that new chunks cannot be added to such a closed container unless a "neighbor condition" is satisfied. The size of a container may be considered to have reached the flexing threshold when the size of the container (based on aggregating the size of the chunk(s) in the container) is at or has exceeded the flexing threshold, or alternatively, when the size of the container would exceed the flexing threshold if a new chunk were to be added to the container.

The technique of closing a container when the container's size has reached the flexing threshold is part of a "flexing technique," which provides a more efficient way of adding new chunks to containers. The flexing technique (along with the "neighbor condition" that is used by the flexing technique) is discussed further below in connection with FIGS. 2 and 3.

Even with the flexing technique for adding chunks to closed containers, containers can still become full (in other words, the size of containers can reach the maximum size). FIG. 1 is a flow diagram of a process of handling the condition where a container has become full (in other words, an overflow condition has occurred with respect to the container). In alternative implementations, an overflow condition is considered to have occurred if a container reaches a predefined size threshold, which can be less than the maximum size of the container.

According to FIG. 1, chunks are stored (at 102) in a first container of a data store, where the chunks are produced by dividing input data during a deduplication process. It is determined (at 104) whether a size of the first container has reached a predefined size threshold (which can be the maximum size of the first container or some other predefined size threshold). The size of the container is considered to have reached the predefined size threshold if the size of the container (based on aggregating the size of the chunk(s) contained in the container) is at or exceeds the predefined size threshold, or alternatively, if addition of a new chunk to the container would cause the size of the container to exceed the predefined size threshold.

In response to determining that the size of the first container has reached the predefined size threshold (which means that an overflow condition has occurred with the first container), at least one of the chunks in the first container is moved (at 106) to a second container of the data store.

The moving of at least one chunk between containers in response to determining that a container has reached a predefined size threshold is referred to as leveling. Leveling allows the size of the first container to be reduced to less than the predefined size threshold.

In some implementations, the moving of chunks among containers (among two or more containers) can be performed among existing containers of the data store. An "existing" container refers to a container that is already defined in the data store. Alternatively, the leveling of chunks can be performed among containers where at least one of the containers is a new container that did not previously exist in the data store. In some implementations, the at least one new container is formed by splitting an existing container. In such implementations, in response to determining that a first container has reached a predefined size threshold, the first container is split into multiple containers, and chunks of the first container are distributed across the multiple containers formed from the first container.

As discussed above, a flexing technique is provided in some implementations to close containers when the containers have reached the flexing threshold, even though the containers are not full (in other words, the containers have not reached their maximum size). New chunks can be inserted into closed containers that were closed according to the flexing threshold (so long as such closed containers are not full). A new chunk is allowed to be inserted into a closed container if the new chunk satisfies a neighbor condition.

A "neighbor condition" is satisfied if the new chunk is determined to be a neighbor of an existing chunk in the closed container. A first chunk is considered to be a "neighbor" of a second chunk if it is known that the first and second chunks are logically or physically placed adjacent each other or in proximity of each other within data processed or used by a system, such as a backup system, an archival system, or other type of system. For example, the first and second chunks may sequentially follow one another within backup data that is stored in a data store. When restoring such backup data from the data store on a persistent storage media, it would be more efficient to retrieve the first and second chunks if they were stored in closer proximity to each other, such as within the same container. Effectively, the flexing technique according to some implementations stores a new chunk in deliberate proximity to an existing chunk. In some implementations, placing a new chunk in deliberate proximity to an existing chunk is accomplished by first checking that the neighbor condition is satisfied before inserting the new chunk into a closed container.

Figure 2:
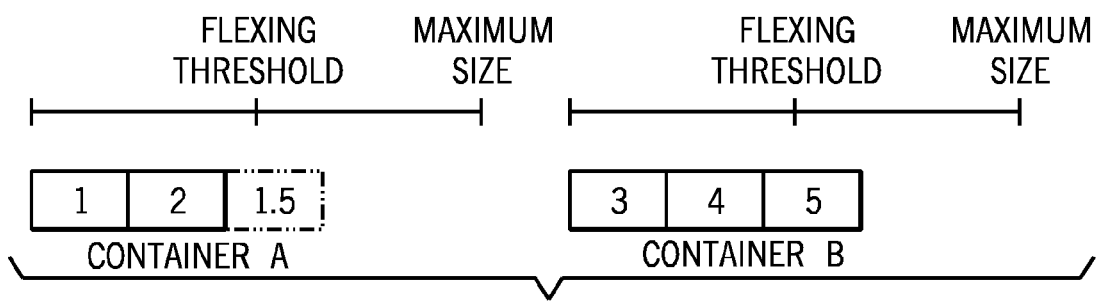
FIG. 2 is a schematic diagram of an example of a flexing technique, according to some embodiments.

FIG. 2 depicts an example of a flexing technique according to some implementations. In FIG. 2, it is assumed that initial input data (e.g., initial backup data stream) to a data store was divided into chunks 1, 2, 3, 4, and 5. FIG. 2 depicts two containers: A and B. Each container A or B has a corresponding maximum size. Moreover, each container A or B has a corresponding flexing threshold, as depicted. The flexing threshold in the example of FIG. 2 is about 50% of the maximum size.

In FIG. 2, chunks 1 and 2 are placed in container A. However, rather than place chunk 3 in container A, which would have caused container A to exceed the flexing threshold, chunk 3 (along with chunks 4 and 5) is placed in container B.

Additional input data may subsequently be received, where the additional data in some examples can be additional backup data. The additional input data can include chunks 1, 1.5, 2, and 3 (in this specific example, chunk 1.5 is a new chunk that did not previously exist in the data store, while chunks 1, 2, and 3 correspond to chunks that already exist in the data store).

In accordance with some implementations, it is determined whether the new chunk 1.5 satisfies the neighbor condition with respect to either container A or container B. Although just two containers are illustrated in the example of FIG. 2, it is noted that more containers can actually be present.

The flexing technique determines that new chunk 1.5 has neighbors 1 and 2; as a result, the flexing technique adds new chunk 1.5 to the container that contains chunks 1 and 2, namely container A. For efficiency, chunk 1.5 may be added to the end of container A rather than rewriting the entire container A to place new chunk 1.5 between chunks 1 and 2 in container A. Having to rewrite a container each time a new chunk is inserted can be relatively expensive in terms of consumption of processing resources. As discussed further below, rather than reorder chunks of a container during ingestion of a chunk into the container, reordering of chunks within a container can be performed as part of a housekeeping procedure or during leveling. In alternative implementations, the chunks of containers (or certain identified containers) can be reordered upon each ingestion of a new chunk.

Figure 3:
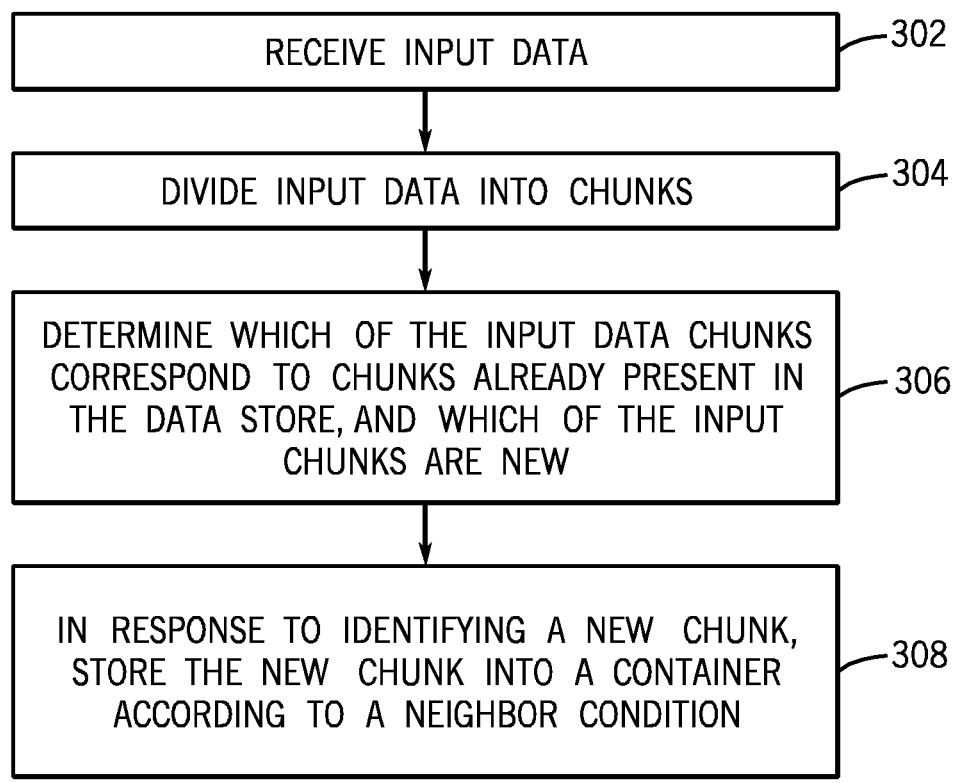
FIG. 3 is a flow diagram of a process of storing input data, according to some embodiments.

FIG. 3 is a flow diagram of a process of storing input data according to some embodiments. Input data is received (at 302) by a chunk-based deduplication system. The chunk-based deduplication system divides (at 304) the input data into chunks. Next, the chunk-based deduplication system determines (at 306) which of the input data chunks correspond to chunks already present in the data store, and which of the input data chunks are new.

In response to identifying a new chunk, the new chunk is stored (at 308) into a particular one of the containers of the data store according to the neighbor condition discussed above. Note that the particular container into which the new chunk is inserted can be a closed container that was closed due to the container reaching the flexing threshold. Alternatively, the particular container can be a container that has not been closed.

As discussed above, when leveling chunks among containers in response to a container reaching a predefined size threshold (such a container is referred to as an "overflowing container"), some implementations involve splitting the overflowing container into N containers (referred to as "resulting containers"), where N is greater than or equal to 2. Splitting an overflowing container into N containers causes chunks of the overflowing container to be distributed among the N containers.

According to some implementations, the distribution of chunks of the overflowing container among the N containers can be performed in such a way that most neighbors end up together in corresponding ones of the resulting containers. In some examples, one or multiple splitting points are identified in the overflowing container, with chunks within the ranges defined by the one or multiple splitting points being moved to the corresponding resulting container. More specifically, if it is assumed that N is equal to 2, then one splitting point is identified for the overflowing container, such as in the middle of the overflowing container. In such examples, chunks before the splitting point will go to a first resulting container, and chunks after the splitting point will move to a second resulting container.

The foregoing technique of identifying one or multiple splitting points for an overflowing container and then simply moving chunks within the ranges defined by the one or multiple splitting points can work well if, upon ingestion of a new chunk into a particular container, the chunks within the particular container are reordered so that the new chunk is between neighbor chunks. However, having to constantly rewrite a chunk container during ingestion of new chunks can be expensive in terms of utilization of processing resources.

To address the foregoing issue, new chunks may be simply appended to the end of a container. In such implementations, however, the ordering of the chunks within a container may not correspond to the ordering of data containing the chunks during actual usage. To allow reordering of chunks at a later point in time, neighbor information can be maintained for at least one chunk (or multiple chunks) within a container. The neighbor information identifies which of the chunks in a container are known to be neighbors of others of the chunks. For example, the neighbor information can be based on the ordering of the chunks corresponding to the ordering that existed when input data is ingested into the data store. The neighbor information associated with a first chunk can include a pointer to a second chunk that is known to be a neighbor of the first chunk. The pointer can also include information regarding which side of the second chunk the first chunk is located on. Stated differently, the neighbor information can indicate, for a given pair of neighbors, which of the neighbors in the pair is on the left side (or on the right side).

If neighbor information is available when an overflowing container is split into N containers, the neighbor information can be taken into account to reorder the chunks according to the neighbor information so that neighboring chunks can be kept close to each other after the splitting.

Although reference is made to using neighbor information during splitting of an overflowing container, it is noted that neighbor information can also be used when performing chunk leveling that involves moving chunks among existing containers (without splitting). Prior to moving chunks among existing containers to perform leveling, the neighbor information that is available can be used to first reorder the chunks before some of the chunks are moved from an overflowing container to another container(s). This reordering may involve moving the physical bits of the chunks or just representations of the chunks (e.g., pointers to them).

Figure 4:
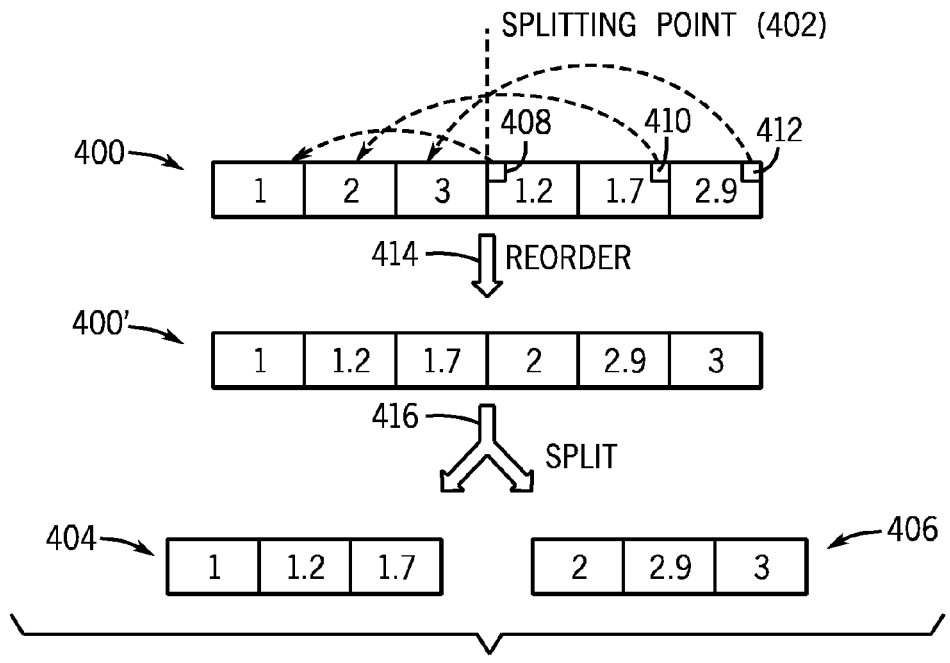
FIG. 4 is a schematic diagram of a technique of splitting a chunk container, according to further embodiments.

FIG. 4 depicts a specific example of using neighboring information for reordering chunks in the context of splitting, according to some implementations. In FIG. 4, it is assumed that an overflowing container 400 is to be split in the middle (402) into two resulting containers 404 and 406. The chunks of the overflowing container 400 include chunks 1, 2, 3, 1.2, 1.7, and 2.9. Note that chunks 1.2, 1.7, and 2.9 were added to the container 400 after chunks 1, 2, 3 were initially added to the container 400. Consequently, since chunks 1.2, 1.7, and 2.9 were simply appended to the end of the container 400, these chunks are out of order with respect to chunks 1, 2, and 3 in the container 400.

In accordance with some implementations, upon insertion of each of chunks 1.2, 1.7, and 2.9, respective neighbor information 408, 410, and 412 is associated with the respective chunks 1.2, 1.7, and 2.9. Although the neighbor information 408, 410, and 412 is illustrated as being part of the container 400, it is noted that in alternative implementations the neighbor information 408, 410, and 412 can be in a file that is separate from the container 400. For example, the container 400 can be in a first file, while the neighbor information 408, 410, and 412 is in a metadata file associated with the container file.

The neighbor information 408 for chunk 1.2 indicates that chunk 1 is chunk 1.2's left neighbor. The neighbor information 410 for chunk 1.7 indicates that chunk 1.7 is a right neighbor of chunk 2. The neighbor information 412 for chunk 2.9 indicates that chunk 2.9 is a right neighbor of chunk 3.

As further depicted in FIG. 4, as part of the splitting procedure, the chunks within the container 400 are first reordered (at 414), to result in modified chunk container 400'. The modified chunk container 400' includes chunks 1, 1.2, 1.7, 2, 2.9, and 3 in the proper order, based on the neighbor information 408, 410, and 412.

The modified container 400' is then split (at 416) to produce the resulting containers 404 and 406. The container 404 contains chunks 1, 1.2, and 1.7, while the container 406 contains chunks 2, 2.9, and 3. The resulting containers 404 and 406 thus are able to maintain neighbor chunks within the same container.

In general, there may not be a reordering sequence that honors all of the neighbor information. For example, several chunks may want to be the left neighbor of chunk 1, but can not all be its immediate left neighbor. An approximate sequence of chunks that honors as much of the neighbor information as possible can be employed in such cases. A heuristic according to some examples may start with the original chunks and then add the inserted chunks to the sequence one at a time, adding each chunk according to its neighbor information. While this may not produce the best sequence, it can be relatively fast and efficient to compute.

In the example depicted in FIG. 4, each chunk is shown to have two well defined neighbors. In practice, because chunks may occur in different places in various input data streams, they may have different neighbors in different streams. It is assumed that the code that inserts chunks into closed containers infers one or two neighbors for each chunk, which may be used for reordering in the future.

Input data may be deleted from the backup system. In response to deletion of input data, chunks associated with such input data may be garbage collected. Garbage collection refers to removal of chunks from containers. The removal of chunks from containers can reduce the sizes of corresponding containers. If a container contains enough "garbage" chunks (which are chunks that are to be removed from the container), it may be possible to insert a new chunk into such container by first removing the garbage chunks.

For efficiency, garbage chunks can be removed during a housekeeping procedure by rewriting chunk containers to remove the garbage chunks. The rewriting can result in some chunk containers containing less than a predefined minimum size of data (some predefined minimum threshold). To avoid such containers that have a size less than the minimum size threshold, adjacent small containers that are too small by themselves can be merged, by concatenating the chunks of such containers into a single larger container that is below the predefined upper size threshold. If neighbor information is available, chunk containers can be reordered before merging.

During the housekeeping procedure, chunk leveling can be performed. By performing chunk leveling during the housekeeping procedure, the chunk leveling may not have to be performed during chunk ingestion, which can make the ingestion process quicker.

In alternative implementations, instead of only splitting single containers or merging adjacent containers, data can be redistributed over a series of adjacent containers. For example, containers that were 50%, 100%, 20%, 100%, and 50% full, respectively, can be effectively merged into one large container, with the large container then split into five equal containers that are each 64% full.

To cut down on the cost of splitting containers, it may be useful to keep track of how many times any given container has been split (e.g., has been part of a split). When a container overflows, the overflowing container can be split more ways if the overflowing container has been involved in more than one previous splitting of containers. Effectively, a number of plural containers split from an overflowing container depends on a number of times that the overflow container has been part of a split.

Figure 5:
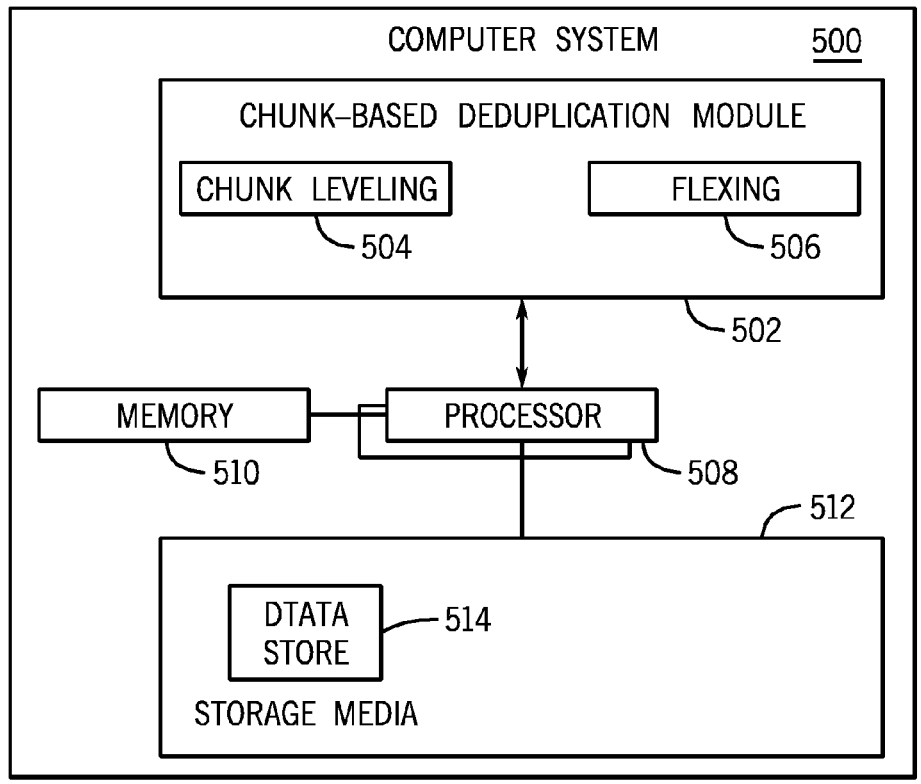
FIG. 5 is a block diagram of an example computer system incorporating some embodiments.

FIG. 5 is a block diagram of an example computer system 500 in which some embodiments can be incorporated. The computer system 500 can be a single-node computer system, or a multi-node, distributed computer system. The computer system 500 can be a backup system or archival system to store backup data. Alternatively, the computer system 500 can be other types of systems, such as desktop computers, notebook computers, personal digital assistants, server computers, and so forth.

The computer system 500 includes a chunk-based deduplication module 502 that can perform chunk-based deduplication, such as depicted in FIG. 3. The chunk-based deduplication module 502 has chunk leveling logic 504 that can perform chunk leveling, such as depicted in FIG. 1 or 4. The chunk-based deduplication module 502 also includes flexing logic 506 to perform the flexing technique, such as according to FIG. 2.

The chunk-based deduplication module 502 can be implemented as machine-readable instructions executable on one or multiple processors 508. The one or multiple processors 508 are connected to memory 510 (e.g., volatile memory) and storage media 512 (e.g., persistent storage media such as disk-based storage media or other types of storage media). The storage media 512 stores a data store 514. In some other implementations, some or all of the content of the storage media 512 can be stored in a system separate from the computer system 500.

The machine-readable instructions of the chunk-based deduplication module 502 are loaded for execution on a processor (such as 508). A processor can include a microprocessor, microcontroller, processor module or subsystem, programmable integrated circuit, programmable gate array, or another control or computing device.

Data and instructions are stored in respective storage devices, which are implemented as one or plural computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EE-PROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. "Storage media" is intended to either a singular storage medium or plural storage media. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
 storing, in a system having a processor, chunks in a first container of a data store, wherein the chunks are produced by dividing input data as part of a deduplication process,
 determining, by the system, whether a size of the first container has reached a predefined size threshold; and
 in response to determining that the size of the first container has reached the predefined size threshold, moving at least one of the chunks in the first container to a second container, wherein moving the at least one of the chunks in the first container to the second container comprises:
 redistributing chunks of a plurality of containers including the first container and the second container, wherein after the redistributing, each of the plurality of containers has a respective size below a second predefined size threshold.

2. The method of claim 1, wherein moving the at least one of the chunks in the first container to the second container comprises:
 splitting, by the system, the first container into plural containers, wherein the second container is one of the plural containers.

3. The method of claim 2, wherein the splitting comprises:
 distributing the chunks of the first container among the plural containers.

4. The method of claim 1, wherein the system has multiple containers including the first and second containers, the method further comprising:
 receiving the input data;
 dividing the input data into chunks; and
 storing the input data chunks in the multiple containers based on identifying respective neighboring chunks already in the multiple containers.

5. The method of claim 1, further comprising:
 maintaining neighbor information for at least one of the chunks in the first container, wherein the neighbor information identifies which of the chunks are known to be neighbors of others of the chunks.

6. The method of claim 5, wherein moving the at least one of the chunks in the first container to the second container takes into account the neighbor information.

7. The method of claim 1, further comprising reordering the chunks in the plurality of containers according to neighbor information.

8. The method of claim 1, wherein the data store further includes a third container and a fourth container storing corresponding chunks, the method further comprising:
   merging the third and fourth containers into a resulting container; and
   splitting the resulting container into plural containers.

9. A method comprising:
   storing, in a system having a processor, chunks in a first container of a data store, wherein the chunks are produced by dividing input data as part of a deduplication process,
   determining, by the system, whether a size of the first container has reached a predefined size threshold;
   in response to determining that the size of the first container has reached the predefined size threshold, moving at least one of the chunks in the first container to a second container, wherein moving the at least one of the chunks in the first container to the second container comprises:
   splitting, by the system, the first container into plural containers, wherein the second container is one of the plural containers; and
   tracking a number of times the first container has been part of a split,
   wherein a number of the plural containers split from the first container depends on the tracked number of times.

10. A method comprising:
    storing, in a system having a processor, chunks in a first container of a data store, wherein the chunks are produced by dividing input data as part of a deduplication process,
    determining, by the system, whether a size of the first container has reached a predefined size threshold;
    in response to determining that the size of the first container has reached the predefined size threshold, moving at least one of the chunks in the first container to a second container; and
    maintaining neighbor information for at least one of the chunks in the first container, wherein the neighbor information identifies which of the chunks are known to be neighbors of others of the chunks, wherein the neighbor information further indicates, for a given pair of neighbors, which of the neighbors in the pair is on the left side.

11. A method comprising:
    storing, in a system having a processor, chunks in a first container of a data store, wherein the chunks are produced by dividing input data as part of a deduplication process,
    determining, by the system, whether a size of the first container has reached a predefined size threshold; and
    in response to determining that the size of the first container has reached the predefined size threshold, moving at least one of the chunks in the first container to a second container, wherein moving the at least one chunk is performed as part of a housekeeping procedure that removes garbage chunks associated with deleted data.

12. A computer system comprising:
    a storage media to store a data store having containers of chunks; and
    at least one processor to:
    receive input data;
    divide the input data into chunks as part of a deduplication process;
    determine which of the input data chunks correspond to chunks already present in the data store, and which of the input data chunks are new;
    in response to identifying a new input data chunk, store the new input data chunk into one of the containers according to a neighbor condition;
    in response to determining that a size of a particular one of the containers has reached a predefined size threshold, moving at least one chunk from the particular container to another container;
    rewrite a given one of the containers to remove garbage chunks from the given container;
    determine whether a size of the given container is smaller than a second predefined size threshold; and
    in response to determining that the size of the given container is smaller than the second predefined size threshold, merge the given container with another container.

13. A computer system comprising:
    a storage media to store a data store having containers of chunks; and
    at least one processor to:
    receive input data;
    divide the input data into chunks as part of a deduplication process;
    determine which of the input data chunks correspond to chunks already present in the data store, and which of the input data chunks are new;
    in response to identifying a new input data chunk, store the new input data chunk into one of the containers according to a neighbor condition; and
    in response to determining that a size of a particular one of the containers has reached a predefined size threshold, moving at least one chunk from the particular container to another container, wherein moving of the at least one chunk from the particular container to the another container is performed by redistributing chunks of a plurality of containers including the particular container and the another container, wherein after the redistributing, each of the plurality of containers has a respective size below a second predefined size threshold.

14. The computer system of claim 13, wherein moving of the at least one chunk from the particular container to the another container is performed by splitting the particular container into plural containers, wherein the another container is one of the plural containers.

15. The computer system of claim 13, wherein the at least one processor is to further:
    maintain neighbor information for at least one of the chunks in the particular container, wherein the neighbor information identifies which of the chunks are known to be neighbors of others of the chunks.

16. The computer system of claim 15, wherein moving of the at least one chunk in the particular container to the another container takes into account the neighbor information.

17. An article comprising at least one computer-readable storage medium storing instructions that upon execution cause a computer system to:
    store chunks in a first container of a data store, wherein the chunks are produced by dividing input data as part of a deduplication process;
    determine whether a size of the first container has reached a predefined size threshold; and
    in response to determining that the size of the first container has reached the predefined size threshold, move at least one of the chunks in the first container to a second container, wherein the data store further includes a third container and a fourth container storing corresponding chunks;

merge the third and fourth containers into a resulting container; and split the resulting container into plural containers.

18. The article of claim 17, wherein the data store has multiple containers, and wherein the instructions upon execution cause the computer system to further:

receive the input data;

divide the input data into chunks;

determine which of the input data chunks correspond to chunks already present in the data store, and which of the input data chunks are new;

in response to identifying a new input data chunk, store the new input data chunk into one of the multiple containers according to a neighbor condition, where the neighbor condition specifies that the new input data chunk is to be stored into a container containing another data chunk that is a neighbor of the new input data chunk.

* * * * *